US007116323B2

(12) United States Patent
Kaye et al.

(10) Patent No.: US 7,116,323 B2
(45) Date of Patent: Oct. 3, 2006

(54) METHOD OF HIDDEN SURFACE RECONSTRUCTION FOR CREATING ACCURATE THREE-DIMENSIONAL IMAGES CONVERTED FROM TWO-DIMENSIONAL IMAGES

(75) Inventors: Michael C. Kaye, Agoura Hills, CA (US); Charles J. L. Best, Los Angeles, CA (US)

(73) Assignee: In-Three, Inc., Westlake Village, CA (US)

( * ) Notice: Subject to any disclaimer, the term of this patent is extended or adjusted under 35 U.S.C. 154(b) by 68 days.

(21) Appl. No.: 10/316,672

(22) Filed: Dec. 10, 2002

(65) Prior Publication Data

US 2005/0104878 A1 May 19, 2005

Related U.S. Application Data

(63) Continuation-in-part of application No. 10/147,380, filed on May 15, 2002, which is a continuation-in-part of application No. 10/029,625, filed on Dec. 19, 2001, now Pat. No. 6,515,659, which is a continuation-in-part of application No. 09/819,420, filed on Mar. 26, 2001, now Pat. No. 6,686,926, which is a continuation-in-part of application No. 09/085,746, filed on May 27, 1998, now Pat. No. 6,208,348.

(51) Int. Cl.
*G06T 15/00* (2006.01)

(52) U.S. Cl. .............. 345/419; 345/420; 345/422; 348/42; 348/43; 348/44

(58) Field of Classification Search ............... 345/419, 345/420, 422, 428, 619, 629; 348/42–44
See application file for complete search history.

(56) References Cited

U.S. PATENT DOCUMENTS 3,621,127 A 11/1971 Hope .................. 348/56

(Continued)

FOREIGN PATENT DOCUMENTS

EP        1187494 A2        3/2002

(Continued)

OTHER PUBLICATIONS

Ohm et al., An Object-Based System for Stereopscopic Viewpoint Synthesis, IEEE transaction on Circuits and Systems for Video Technology, vol. 7, No. 5, Oct. 1997, pp. 801-811.*

(Continued)

*Primary Examiner*—Phu K. Nguyen
(74) *Attorney, Agent, or Firm*—Henricks, Slavin & Holmes LLP

(57) ABSTRACT

An exemplary method of reconstructing a hidden surface area in an image includes the steps of: identifying a separation pixel gap in an image resulting from a repositioning of image pixels to create a three-dimensional image; identifying pixels from one or more images; and filling the separation pixel gap with the pixels. Replacement pixels can be retrieved from a single image in a search sequence of images, or from a plurality of images in the sequence. One or more pixel fill techniques can be employed to determine replacement pixels for the separation pixel gap which best match adjacent background pixels.

26 Claims, 6 Drawing Sheets

U.S. PATENT DOCUMENTS

| | | | |
|---|---|---|---|
| 3,737,567 A | 6/1973 | Kratomi | 348/56 |
| 3,772,465 A | 11/1973 | Vlahos et al. | 345/519 |
| 3,851,955 A | 12/1974 | Kent et al. | 352/60 |
| 4,017,166 A | 4/1977 | Kent et al. | 352/57 |
| 4,021,846 A | 5/1977 | Roese | 348/57 |
| 4,168,885 A | 9/1979 | Kent et al. | 352/129 |
| 4,183,633 A | 1/1980 | Kent et al. | 352/129 |
| 4,235,503 A | 11/1980 | Condon | 352/60 |
| 4,436,369 A | 3/1984 | Bukowski | 359/352 |
| 4,475,104 A | 10/1984 | Shen | 340/729 |
| 4,544,247 A | 10/1985 | Ohno | 359/462 |
| 4,558,359 A | 12/1985 | Kuperman et al. | 368/64 |
| 4,600,919 A | 7/1986 | Stern | 340/725 |
| 4,603,952 A | 8/1986 | Sybenga | 352/62 |
| 4,606,625 A | 8/1986 | Geshwind | 352/38 |
| 4,608,596 A | 8/1986 | Williams et al. | 348/34 |
| 4,645,459 A | 2/1987 | Graf et al. | 434/43 |
| 4,647,965 A | 3/1987 | Imsand | 358/88 |
| 4,697,178 A | 9/1987 | Heckel | 340/729 |
| 4,723,159 A | 2/1988 | Imsand | 348/50 |
| 4,809,065 A | 2/1989 | Harris et al. | 358/88 |
| 4,888,713 A | 12/1989 | Falk | 345/582 |
| 4,925,294 A | 5/1990 | Geshwind et al. | 352/57 |
| 4,933,670 A | 6/1990 | Wislocki | 340/709 |
| 4,965,844 A | 10/1990 | Oka et al. | 345/581 |
| 5,002,387 A | 3/1991 | Baljet et al. | 352/65 |
| 5,177,474 A | 1/1993 | Kadota | 340/729 |
| 5,181,181 A | 1/1993 | Glynn | 364/566 |
| 5,185,852 A | 2/1993 | Mayer | 395/109 |
| 5,237,647 A | 8/1993 | Roberts et al. | 395/119 |
| 5,341,462 A | 8/1994 | Obata | 395/122 |
| 5,347,620 A | 9/1994 | Zimmer | 395/129 |
| 5,402,191 A | 3/1995 | Dean et al. | 352/63 |
| 5,428,721 A | 6/1995 | Sato et al. | 345/650 |
| 5,481,321 A | 1/1996 | Lipton | 354/57 |
| 5,495,576 A | 2/1996 | Ritchey | 345/420 |
| 5,699,444 A | 12/1997 | Palm | 382/106 |
| 5,739,844 A | 4/1998 | Kuwano et al. | 348/43 |
| 5,742,291 A | 4/1998 | Palm | 345/420 |
| 5,748,199 A | 5/1998 | Palm | 345/473 |
| 5,907,364 A | 5/1999 | Furuhata et al. | 348/443 |
| 5,929,859 A | 7/1999 | Meijers | 345/419 |
| 5,973,700 A | 10/1999 | Taylor et al. | 345/427 |
| 5,973,831 A | 10/1999 | Kleinberger et al. | 348/43 |
| 6,011,581 A | 1/2000 | Swift et al. | 348/58 |
| 6,023,276 A | 2/2000 | Kawai et al. | 345/419 |
| 6,031,564 A * | 2/2000 | Ma et al. | 348/43 |
| 6,088,006 A | 7/2000 | Tabata | 345/7 |
| 6,091,421 A | 7/2000 | Terrasson | 345/419 |
| 6,166,744 A | 12/2000 | Jaszlics et al. | 345/629 |
| 6,198,484 B1 | 3/2001 | Kameyama | 345/419 |
| 6,208,348 B1 * | 3/2001 | Kaye | 345/419 |
| 6,215,516 B1 | 4/2001 | Ma et al. | 348/43 |
| 6,456,340 B1 | 9/2002 | Margulis | 345/501 |
| 6,496,598 B1 | 12/2002 | Harman | 382/154 |
| 6,535,233 B1 | 3/2003 | Smith | 345/661 |
| 6,590,573 B1 | 7/2003 | Geshwind | 345/419 |
| 6,650,339 B1 | 11/2003 | Silva et al. | 345/619 |
| 6,677,944 B1 | 1/2004 | Yamamoto | 345/422 |
| 6,765,568 B1 | 7/2004 | Swift et al. | 345/419 |
| 6,791,542 B1 * | 9/2004 | Matusik et al. | 345/420 |
| 2002/0048395 A1 | 4/2002 | Harman et al. | 382/154 |
| 2002/0063780 A1 | 5/2002 | Harman et al. | 348/14.05 |
| 2002/0075384 A1 | 6/2002 | Harman | 348/51 |

FOREIGN PATENT DOCUMENTS

| | | |
|---|---|---|
| WO | WO 97/24000 A1 | 7/1997 |
| WO | WO 99/12127 A1 | 3/1999 |
| WO | WO 99/30280 A1 | 6/1999 |
| WO | WO 00/79781 A1 | 12/2000 |
| WO | WO 02/13143 A1 | 2/2002 |

OTHER PUBLICATIONS

Izquierdo et al., Virtual 3D-View Generation from Stereoscopic Video Data, IEEE, Jan. 1998, pp. 1219-1224.*

Kaufman, D., "The Big Picture", Apr. 1998, http://www.xenotech.com Apr. 1998, pp. 1-4.

Hanrahan et al., "Direct WYSIWYG painting and texturing on 3D shapes", Computer Graphics, vol. 24, Issue 4, pp. 215-223. Aug. 1990.

Grossman, "Look Ma, No Glasses", Games, Apr. 1992, pp. 12-14.

Slinker et al., "The Generation and Animation of Random Dot and Random Line Autostereograms", Journal of Imaging Science and Technology, vol. 36, No. 3, pp. 260-267, May 1992.

A. Michael Noll, *Stereographic Projections by Digital Computer*, Computers and Automation, vol. 14, No. 5 (May 1965), pp. 32-34.

A. Michael Noll, *Computer-Generated Three-Dimensional Movies*, Computers and Automation, vol. 14, No. 11 (Nov. 1965), pp. 20-23.

Izquierdo et al., Virtual 3D-View Generation from Stereoscopic Video Data, IEEE Jan. 1998, pp. 1219-1224.

* cited by examiner

Frame 10

Frame 20

Frame 30

Left View  Original Frame

Right View

Pixel Repeat Method

Frame 10

Frame 20

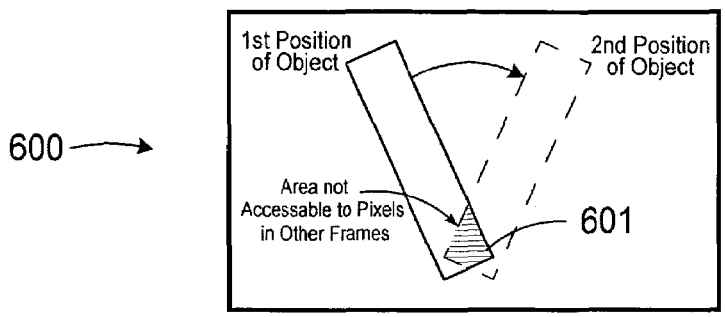
FIG. 6
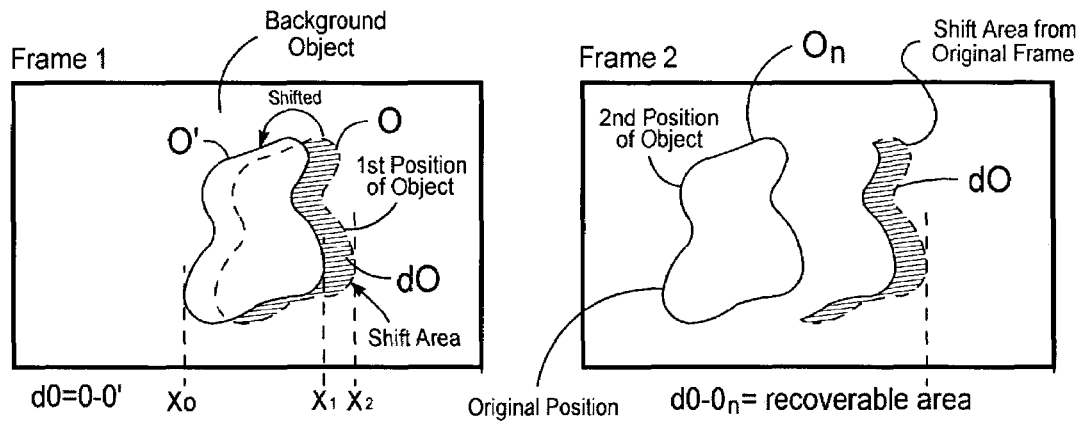
FIG. 7A
FIG. 7B
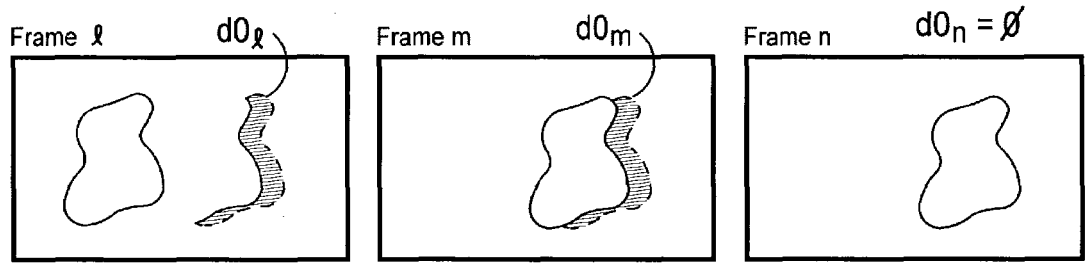
Optimal Area = max $\{\|dO_i\|_{\mathbb{R}^2}\}_i$
FIG. 8
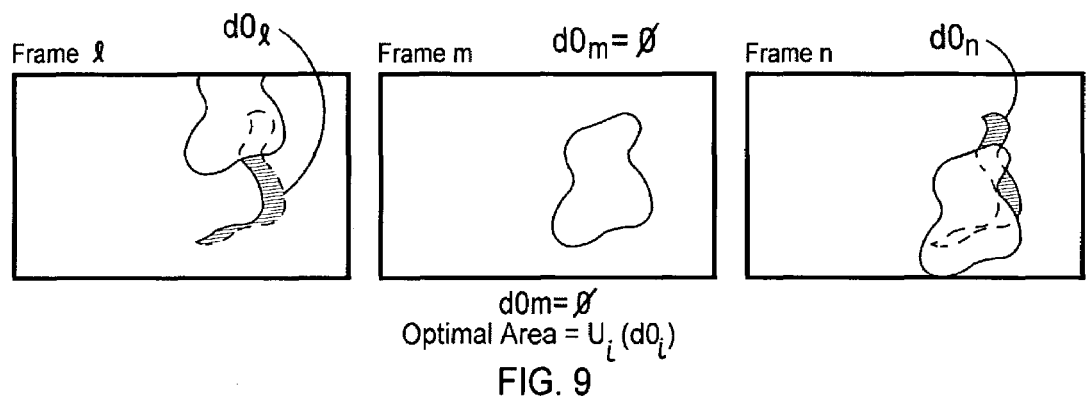
$dO_m = \emptyset$
Optimal Area = $U_i(dO_i)$
FIG. 9

METHOD OF HIDDEN SURFACE RECONSTRUCTION FOR CREATING ACCURATE THREE-DIMENSIONAL IMAGES CONVERTED FROM TWO-DIMENSIONAL IMAGES

CROSS-REFERENCE TO RELATED APPLICATIONS

This application is a continuation-in-part of U.S. patent application Ser. No. 10/147,380 entitled "Method For Conforming Objects To A Common Depth Perspective For Converting Two-Dimensional Images Into Three-Dimensional Images" filed on May 15, 2002, which is a continuation-in-part of U.S. patent application Ser. No. 10/029,625 entitled "Method And System For Creating Realistic Smooth Three-Dimensional Depth Contours From Two-Dimensional Images" filed on Dec. 19, 2001, now U.S. Pat. No. 6,515,659 which is a continuation-in-part of U.S. patent application Ser. No. 09/819,420 entitled "Image Processing System and Method for Converting Two-Dimensional Images Into Three-Dimensional Images" filed on Mar. 26, 2001, now U.S. Pat. No. 6,686,926 which is a continuation-in-part of U.S. patent application Ser. No. 09/085,746 entitled "System and Method for Converting Two-Dimensional Images into Three-Dimensional Images" filed on May 27, 1998, now U.S. Pat. No. 6,208,348, all of which are incorporated herein by reference in their entirety.

BACKGROUND OF THE INVENTION

In the process of converting two-dimensional (2D) motion picture images into three-dimensional (3D) motion picture images, each frame of the motion picture has another perspective of the image created that perhaps was not originally recorded. This is referred to as a complementary image. Reconstructing the complementary image is done by applying algorithms that cause pixels to be shifted along the horizontal axis of the image.

In the process of creating a 3D perspective image out of a 2D image, various objects or portions of objects within the image are repositioned. If an image object requires repositioning along the horizontal, or X axis, to effectively position the object toward or away from the viewer, the repositioned object covers up existing pixels on one side of the object and creates a gap of missing pixels on the other side of the object. This gap of missing pixels may also be referred to as the pixel fill area. For example, if an object is placed in the foreground, that object in a newly-created right view will be positioned to the left, covering over pixels on its left edge. As objects shift their position, they cover up existing pixels in the direction that the object moves, and leave a gap of missing pixel information on the other side of the object.

In U.S. patent application Ser. No. 09/819,420, it was disclosed ("Repeat Pixel" feature) that the missing gap of pixels can be filled by repeating pixels from the edge of the background object that the object is moving away from. In many cases, this approach is sufficient even though the pixel repeat information is not an exact replica of the pixel information that should actually be present in the gap of missing information. As long as the pixel repeat gap is not extensively large (which would occur if the object happens to move a great distance toward or away from the viewer) and as long as the repeat pixel information does not exhibit any type of motion artifacts relative to its adjacent surrounding backgrounds, simply "pixel repeating" background pixels across the gap often goes unnoticeable.

One of the reasons that pixel repeating can go unnoticed is that the pixel repeating occurs in only one image and is therefore seen by only one eye. In effect, it is part of a three-dimensional disparity. The brain interprets depth by differences of what we perceive with our left and right eye of an image. The fact that the image seen by one eye contains pixel repeat information can, in many cases, go quite undetectable. Even in a real photographed 3D image, the edges of foreground against background result in edges differences between the left and right eye views.

It is the consistency and uniformity of the content along the edges of objects that the brain evaluates to determine whether an image should be accepted as a legitimate coherent 3D image, rather than an image with distracting artifacts. If the edges start to become out of context with the surrounding background, either by size or shape for example, the brain will tend to interpret and sense these areas of the image as artifacts. It is when the differences become too great and inconsistent with the flow of the image content that the brain stimulates human senses to consciously perceive such image artifacts as distracting and/or unreal.

There are some cases in the process of converting two-dimensional images into three-dimensional images where the background information around a surrounding object does not lend itself to pixel repeating. This may either be because the gap is too wide or because there may be too much activity of motion near the edge of the object by other objects. In this case, the area of pixel fill is simply not a good fit and results in a visual distraction.

In view of the foregoing, it would be desirable to be able reduce or eliminate image artifacts that occur in the process of applying depth to objects during the conversion of 2D images into 3D images.

BRIEF DESCRIPTION OF THE DRAWINGS

Detailed description of embodiments of the invention will be made with reference to the accompanying drawings:

FIG. 6 illustrates two positions of a simple rectangular object to illustrate the areas of available replacement pixels and the areas where no available pixels are revealed;

FIGS. 7A and 7B illustrate how the shifting of an object in position over a sequence of frames makes is possible to locate missing image information in alternate frames;

FIG. 8 illustrates a search sequence in which a single frame includes all of the recovery information; and FIG. 9 illustrates a search sequence in which the recovery information is retrieved from a plurality of the frames in the sequence.

DETAILED DESCRIPTION

The following is a detailed description of the best presently known mode of carrying out the invention. This description is not to be taken in a limiting sense, but is made merely for the purpose of illustrating the general principles of the invention.

In order to recreate a high quality, realistic three-dimensional image from a two-dimensional image, conversion artifacts must be eliminated, or at least minimized. The methods of the present invention eliminate or significantly reduce pixel fill artifacts. Various methods of the present invention generally involve retrieving missing pixel information for object separation gaps from other frames or images.

Figure 1:
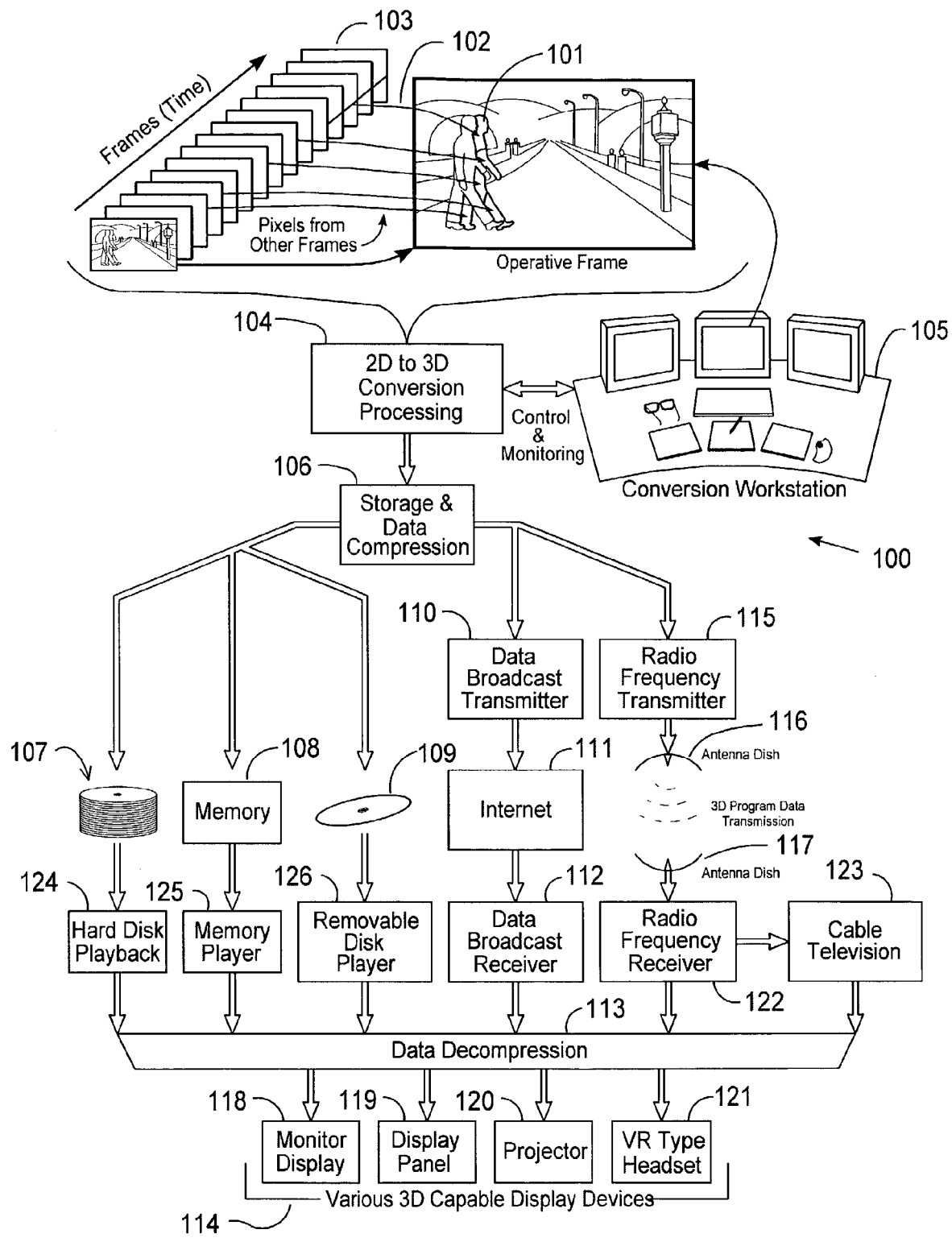
FIG. 1 illustrates an exemplary system and workstation for implementing the image processing techniques of the present invention.

FIG. 1 shows an exemplary system 100 suitable for implementing the various methods of the present invention. During the process of converting images into 3D images, the original positions of image objects are shifted to adjust the perceived depths of the objects in the resulting 3D images forward or back toward the viewer. By way of example, and referring to the Operative Frame shown in FIG. 1, when the object corresponding to the man walking across the street is shifted to the left, a separation pixel gap 101 results. According to various embodiments of the present invention, pixel artifacts that are inherently caused by the process of objects being positioned in depth are avoided by using hidden pixels 102 from other images or frames 103 to fill pixels in the separation pixel gap 101. The hidden pixels 102 can be used, semi-automatically or automatically (see below), as they become revealed from other frames 103 to eliminate pixel repeat artifacts.

Various principles of the present invention are embodied in an interactive user interface and a plurality of image processing tools that allow a user to rapidly convert a large number of images or frames to create authentic and realistic appearing three-dimensional images. In the illustrated exemplary system 100, the 2D-to-3D conversion processing 104 is implemented and controlled by a user working at a conversion workstation 105. It is here, at a conversion workstation 105, that the user gains access to the interactive user interface and the image processing tools and controls and monitors the results of the 2D-to-3D conversion processing 104. It should be understood that the functions implemented during the 2D-to-3D processing 104 can be performed by one or more processor/controller. Moreover, these functions can be implemented employing a combination of software, hardware and/or firmware taking into consideration the particular requirements, desired performance levels, etc. for a given system or application.

The three-dimensional converted product and its associated working files can be stored (storage and data compression 106) on hard disk, in memory, on tape, or on any other means of data storage. In the interest of conserving space on the above-mentioned storage devices, it is standard practice to data compress the information; otherwise files sizes can become extraordinarily large especially when dealing with a full-length motion picture. Data compression also becomes necessary when the information needs to pass through a system with limited bandwidth, such as a broadcast transmission channel, for instance, although compression is not absolutely necessary to the process if bandwidth limitations are not an issue.

The three-dimensional converted content data can be stored in many forms. The data can be stored on a hard disk 107 (for hard disk playback 124), in removable or non-removable memory 108 (for use by a memory player 125), or on removable disks 109 (for use by a removable disk player 126), which may include but are not limited to digital versatile disks (dvd's). The three-dimensional converted product can also be compressed into the bandwidth necessary to be transmitted by a data broadcast receiver 110 across the Internet 111, and then received by a data broadcast receiver 112 and decompressed (data decompression 113), making it available for use via various 3D capable display devices 114.

Similar to broadcasting over the Internet, the product created by the present invention can be transmitted by way of electromagnetic or RF (radio frequency) transmission by a radio frequency transmitter 115. This includes direct conventional television transmission, as well as satellite transmission employing an antenna dish 116, which is much more prevalent these days. The content created by way of the present invention can be transmitted by satellite and received by an antenna dish 117, decompressed, and viewed on a monitor display 118, possibly incorporating a cathode ray tube (CRT), a display panel 119 such as a plasma display panel (PDP) or liquid crystal display (LCD), a front or rear projector 120 in the home, industry, or in the cinema, or a virtual reality (VR) type of headset 121. If the three-dimensional content is broadcast by way of RF transmission, the receiver 122, can in feed decompression circuitry directly, or feed a display device directly. Either is possible. It should be noted however that the content product produced by the present invention is not limited to compressed data formats. The product may also be used in an uncompressed form. Another use for the product and content produced by the present invention is cable television 123.

Figure 2:
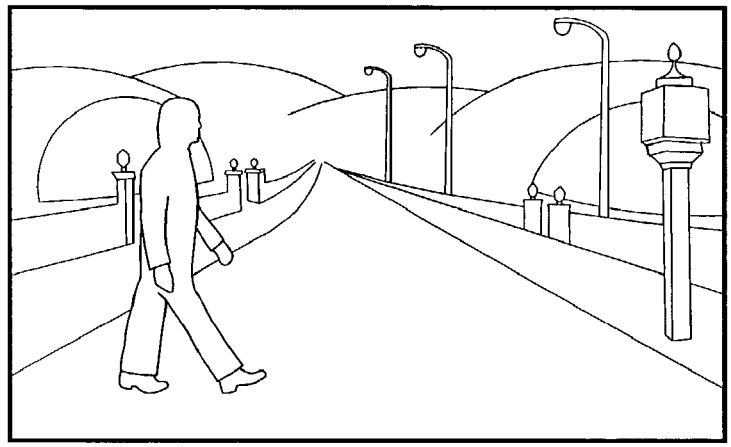
FIG. 2 illustrates a sequence of frames of a person walking against a background.
Figure 2:
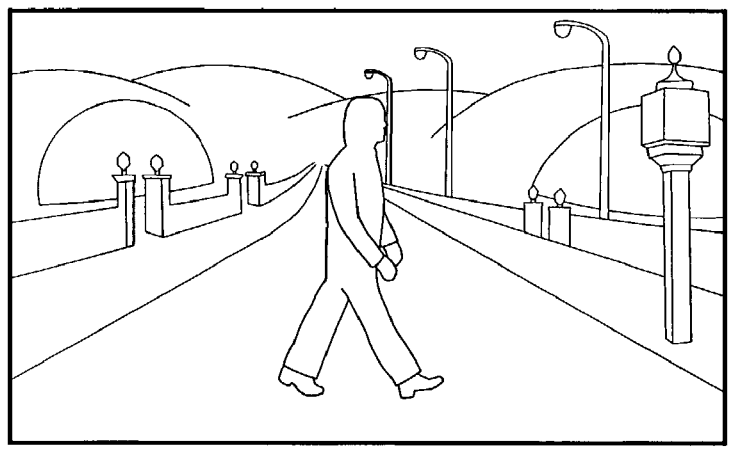
Figure 2:
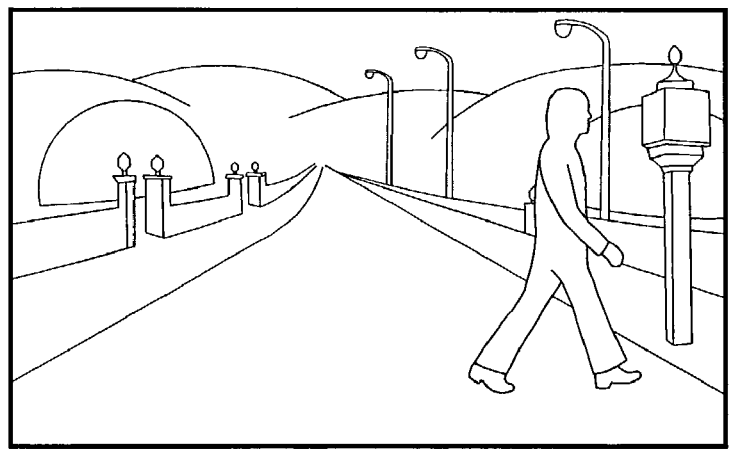

FIG. 2 illustrates three frames of an image sequence showing a person walking across a street. From top to bottom, the three frames are denoted "Frame 10", "Frame 20" and "Frame 30". These frames show the person in the left lane of the street, in the center of the street, and in the right lane of the street, respectively. As each frame has its objects shifted to create an alternate three-dimensional perspective, the foreground object, for example, of the person walking is shifted relative to its background.

Figure 3A:
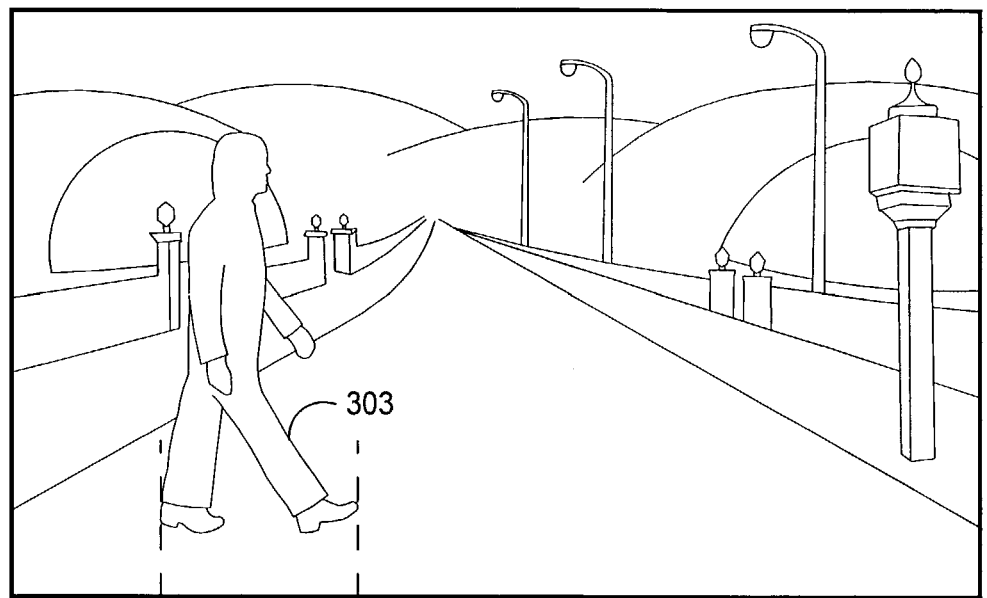
FIG. 3A illustrates an example of a foreground object in an original image.
Figure 3B:
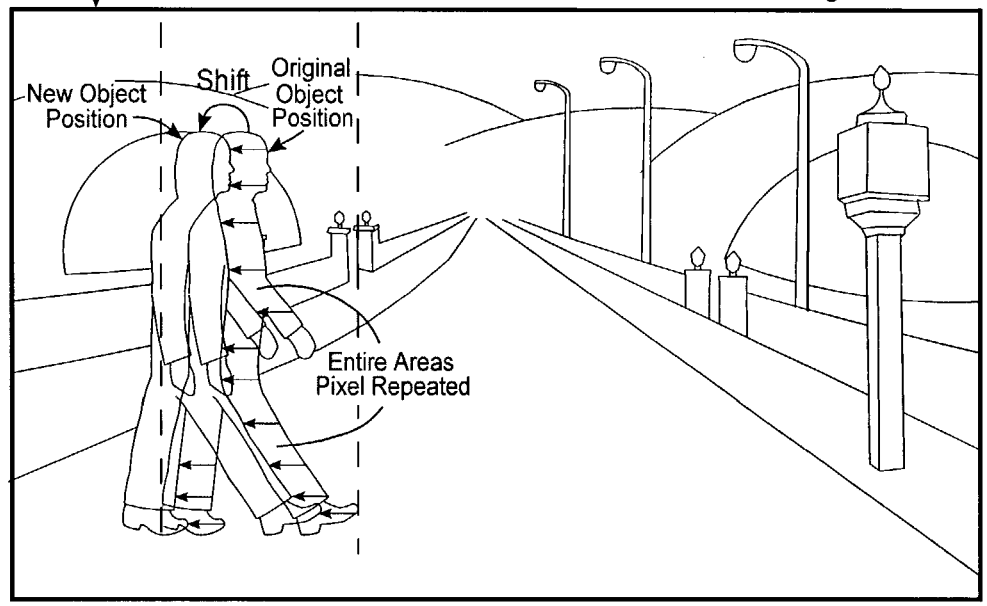
FIG. 3B illustrates the foreground object of FIG. 3A shifting position with the pixel repeat method being implemented.

FIGS. 3A and 3B illustrate an exemplary application of the Repeat Pixel method disclosed in U.S. patent application Ser. No. 09/819,420 which provides an approximation of what would have been at the edges of objects within the foreground/background separation gap, if the image had been photographed originally from that perspective angle. Referring to FIG. 3A, an original frame 301 is established, for this example, as the left view of one of the two three-dimensional perspectives. The frame 301 includes an object 303 of the person walking across the street. Referring to FIG. 3B, a complementary frame 302 is an image created from the original frame 301, for this example, as the right view of one of the two three-dimensional perspectives. In this example, the object 303 is shifted to the left to create the complementary frame 302. The background object pixels just to the right of the foreground object are repeated across the gap of missing pixels toward the left as the object is positioned to the left as an approximate reconstruction of the background object in the area of the foreground object's original position. This Repeat Pixel process can be used for each frame of the motion picture sequence.

In many situations objects do not remain stationary across multiple frames. For example, objects could move side to side or up and down independent of other objects in the scene or with various camera movements. The present invention makes use of the fact that there may be more accurate pixels available in other frames that can be captured and placed in more critical areas where pixel repeating may not be appropriate for filling the gaps in the scene image that result from object position shifts. The utilization of more accurate pixel information, in turn, facilitates the creation of more accurate three-dimensional reproductions. Thus, various methods of the present invention are embodied in a system which allows a user to quickly and accurately provide the (most consistent and accurate) pixel fill information that will result in the most realistic three-dimensional conversion. Speed and accuracy are both very important in the process of converting full-length motion pictures as they may contain more than one hundred and fifty thousand frames.

Figure 4A:
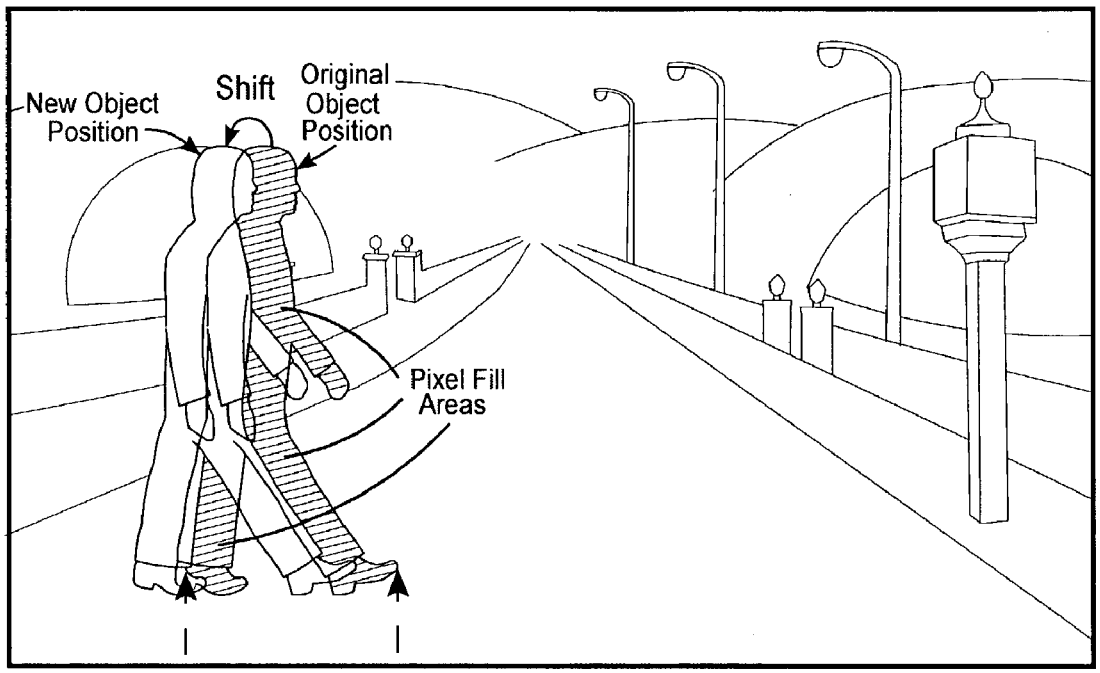
FIG. 4A illustrates an example of pixel fill areas being replaced by pixels from another frame according to an exemplary method the present invention.
Figure 4B:
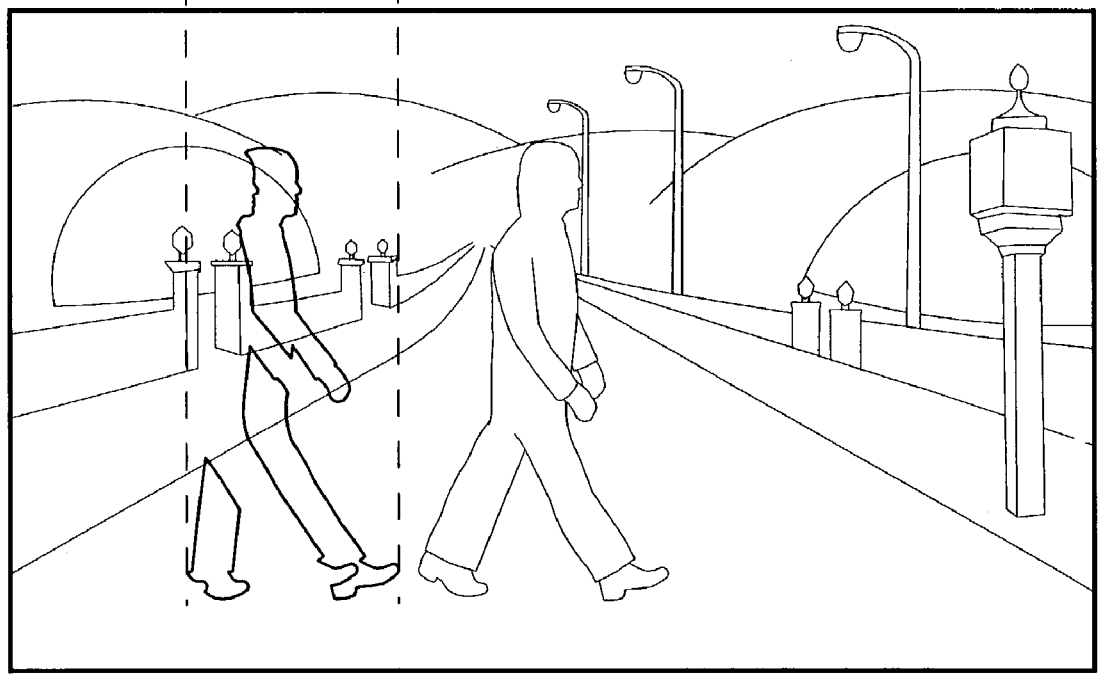
FIG. 4B illustrates an example of the area of pixels to be copied into the frame of FIG. 4A.

According to an embodiment of the present invention, rather than using the Pixel Repeat method, more accurate pixels (e.g., from other frames) are used to fill the pixel gaps. Using more accurate pixel fill information reduces the occurrence of noticeable artifacts from object positioning during the conversion process as objects are positioned in or out of the image. The method of reconstructing obscured background areas is accomplished by copying pixels from other frames where the background pixels are revealed. FIG. 4A illustrates an example image (Frame 10) where the pixel fill area is filled by more correct and consistent pixel information. In this example, pixels are retrieved from a different image (Frame 20—FIG. 4B). In frame 20, the person has moved to a completely different position relative to the background revealing useful background pixels in the area that was originally blocked in FIG. 4A by the foreground object. These pixels can now be used to fill in any gaps created by the foreground object's shift in relative depth positioning. In one embodiment, the goal is to construct the most accurate approximation of what would have been at these edges had the image been actually photographed from that perspective angle vantage point. The end result will be a much more realistic three-dimensional image free of distracting artifacts.

Referring again to FIG. 2, in this simple scenario the background is stationary and only the person, a foreground object, has moved. However, this may not always be the case. In many cases, the camera may also be in motion as foreground and background objects alter their relative positions. Even though useful background pixels are revealed in other frames, there are many image variables. For example, the image may tilt, or move in or out, or rotate its position. According to various hidden image reconstruction methods of the present invention, these variables are taken into account.

Even though useful pixels may become revealed in other frames, the camera may have moved, or tilted, or zoomed, etc. Thus, as available and revealed pixels may not always be from stationary camera shots, various methods of the present invention are embodied in tools ("handles") that allow the user to alter the image in a desired manner. For example, the interactive user interface can be configured to provide the user with one or more tools that allow the user to adjust the revealed pixels to fit more precisely in the pixel gap. Exemplary handles, as such, or tools, allow the user to rotate, position, size, distort, or blur the pixels to achieve the best match to the edge background to make it appear "transparent" to the viewer. Ideally, the viewer will not recognize the pixel gap areas once pixels are fitted. The pixel gap areas should go unnoticed, as they would in a real 3D image if one were to analyze that perspective angle view. Although the foregoing discussion makes reference to obtaining useful and available pixels from other frames, it should be appreciated that the scope of the present invention additionally includes obtaining useful pixels that become available anywhere in the subject frame.

Various methods of the present invention are embodied in interactive tools designed to allow the user to not only retrieve the best set of pixels as the closest match, but also to adjust them accordingly to provide the best fit to match adjacent backgrounds. Such interactive tools include, for example, horizontal and vertical sizing and positioning of the area pixels, rotation of the pixels, geometric distortions, color correction, and the ability to blur the pixels. The interactive tools also allow the user to obtain the best match to the adjacent backgrounds in an expeditious manner.

According to various methods of the present invention, the pixel gap areas that become reconstructed, or rather, filled-in by pixels from other frames, can also have corresponding depth shape and depth values applied to them so that they blend in more consistently with their associated background objects. In other words, the pixel gap areas can be provided with depth shape, varying depth, etc., rather than having a uniform depth value (which would cause the pixel gap area to appear to be flat). For example, if a foreground object shifts its position, moving toward the viewer, creating a pixel gap, and the pixels for that pixel area gap are then retrieved from another frame and filled in, that pixel gap area can also have the appropriate depth properties added to it so as to not appear flat. In one embodiment, the depth properties are consistent with the adjacent object pixel surroundings. In another embodiment, objects are defined as Virtual Objects as disclosed in U.S. patent application Ser. Nos. 10/147,380, 10/029,625 and 09/819,420. Generally, Virtual Objects are objects defined in their entirety, ignoring other objects that may be in front of them. In some situations, it is much easier to apply depth to the pixel gap areas if objects are defined as Virtual Objects.

Figure 5:
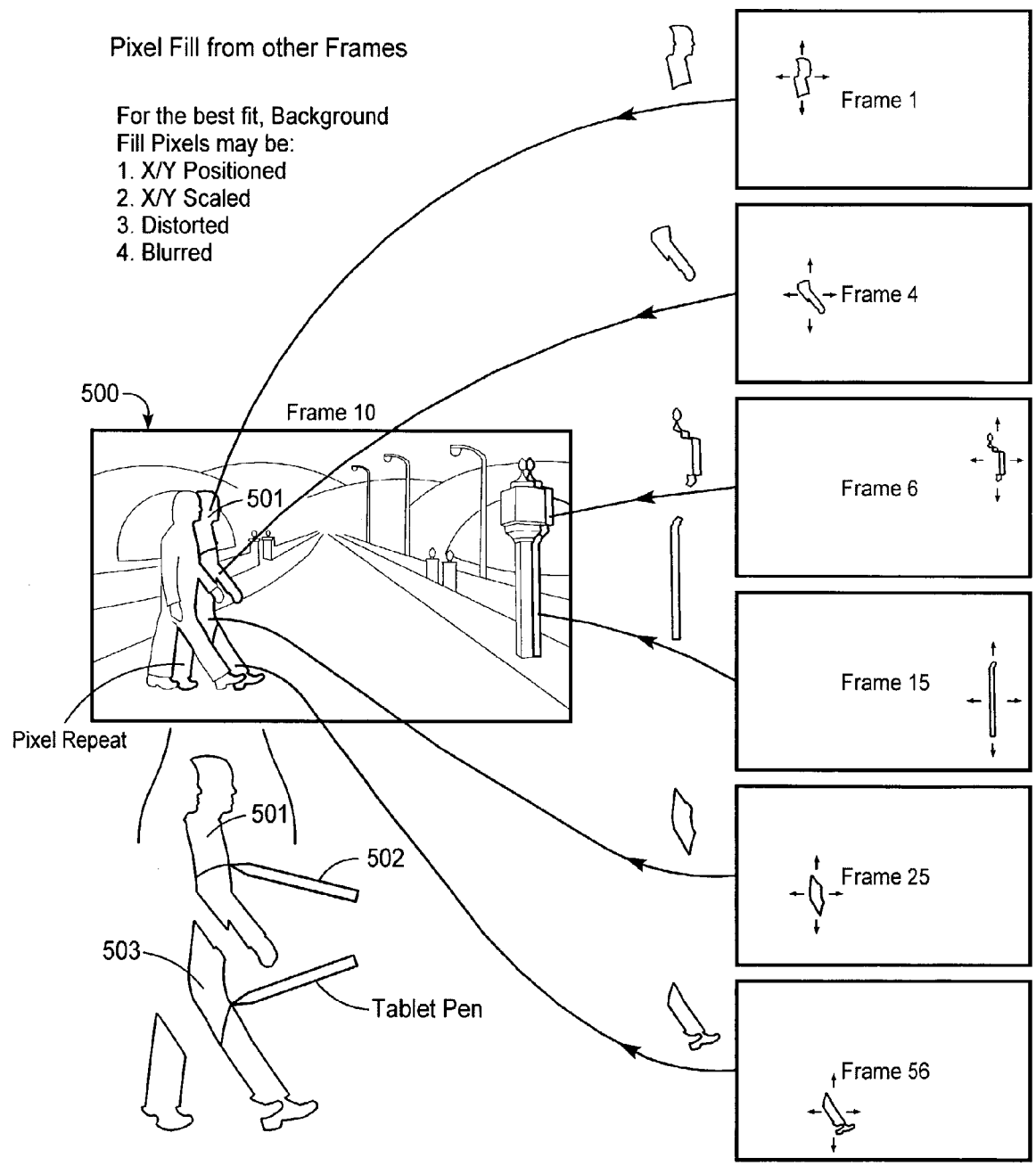
FIG. 5 illustrates an example of an image for which areas of pixels are copied from multiple frames according to an exemplary method the present invention.

Various methods of the present invention are embodied in interactive tools designed to allow the user to obtain pixels from any number of images or frames. This functionality accommodates the fact that useful pixels may become revealed at different moments in time in other frames as well as at different locations within an image. FIG. 5 illustrates an exaggerated example where the pixel fill gaps of an image 500 (Frame 10) are filled by pixels from more than one frame. By way of example, the interactive user interface can be configured to allow the user to divide a pixel fill area 501 (e.g., with a tablet pen 502) to use a different set of pixels from different frames, in this case, Frames 1 and 4, for each of the portions of the pixel fill area 501. Similarly, the pixel fill area 503 can be divided to use different pixel fill information retrieved from Frames 25 and 56 for each of the portions of the pixel fill area 503. Ideally, the user is provided with complete flexibility to obtain pixel fill information from any combination of images or frames in order to obtain a best fit and match of background pixels.

According to an embodiment of the present invention, a method for converting two-dimensional images into three-dimensional images includes the steps of: defining an area of pixels of a separation gap within an image frame that was caused by image pixels having moved; and replacing pixels in the separation gap with pixels from one or more different frames. In one embodiment, the step of replacing pixels includes employing an interactive interface to select an area of pixels of a frame within a series or sequence of frames and to use pixels from the selected area to fill the separation gap. In another embodiment, the step of replacing pixels includes employing an interactive interface to select areas of pixels within a series or sequence of frames and to use pixels from the selected areas to fill the separation gap. In another embodiment, the method further includes the step of scaling pixels in the separation gap. In another embodiment, the method further includes the step of repositioning pixels in the separation gap. In another embodiment, the method further includes the step of blurring pixels in the separation gap. In another embodiment, the method further includes the step of color correcting pixels in the separation gap. In another embodiment, the method further includes the step of distorting pixels in the separation gap.

According to an embodiment of the present invention, a method of reconstructing a hidden surface area in an image includes the steps of: identifying a separation pixel gap in an image resulting from a repositioning of image pixels to create a three-dimensional image; identifying pixels from one or more images; and filling the separation pixel gap with the pixels. In one embodiment, the identified separation pixel gap is associated with an object in the image, and the identified pixels are associated with a corresponding object in a different image; the object can be defined in its entirely, ignoring other objects that may be in front of it. In another embodiment, the identified separation pixel gap is associated with a hidden portion of the image, and the identified pixels are associated with a corresponding portion of a different image that is at least partially visible in the different image. In another embodiment, the identified pixels are from a plurality of different image frames. In another embodiment, the step of filling in the separation pixel gap includes scaling the pixels to accommodate the separation pixel gap. In another embodiment, the step of filling in the separation pixel gap includes rotating the pixels to accommodate the separation pixel gap. In another embodiment, the step of filling in the separation pixel gap includes geometrically distorting the pixels. In another embodiment, the step of filling in the separation pixel gap includes color correcting the pixels. In another embodiment, the step of filling in the separation pixel gap includes blurring the pixels. In another embodiment, the method further includes the step of applying a depth shape to the pixels. In another embodiment, the method further includes the step of manipulating depth properties of the pixels in consideration of depth properties of adjacent object pixel surroundings.

If it so happens that there are no useful pixels available for a particular missing pixel or pixels, the user can use the Repeat Pixel method while other pixels for other areas of the same object are taken from other frames. Thus, various embodiments of the present invention allow the user to employ any combination of different pixel fill methods.

FIG. 6 depicts an example of a frame 600 with a rectangular object. The frame 600 shows the object in both first and second positions. In its second position, the object is rotated to the right relative to its first position. In this example, background pixels can be used to fill the positional gaps of the object from each alternate position. However, in area 601 there are no available pixels from any other frame. In this area, alternate pixel fill techniques, such as Repeat Pixel can be used.

According to an embodiment of the present invention, a method of reconstructing a hidden surface area in an image includes the steps of: identifying a separation pixel gap resulting from a repositioning of image pixels to create a three-dimensional image; and employing a plurality of different pixel fill techniques to determine replacement pixels for the separation pixel gap which best match adjacent background pixels.

Various embodiments of the present invention facilitate selection of background pixels in an automated or semi-automated fashion via hidden surface reconstruction software utilities. For example, pixel fill information can be derived from a group of selected frames or from a range of frames as discussed below.

In various embodiments of the present invention, the reconstruction of hidden surface areas involves first determining a range of frames containing areas of the missing data and, second, determining the frame containing the optimal area of missing data within the selected range of frames. In one embodiment, the first determination is approached as a problem of topology and the second determination is approached as a maximization problem. The first problem is a subset of the second problem.

The Topology of the Problem:

An exemplary automated hidden surface reconstruction utility attempts to reconstruct a pixel gap area in a particular frame by determining an alternate frame that contains the largest body of useable pixel information that coincides with the pixel gap area. The term "coincident area" means the area in the alternate frame that is topologically equivalent, under some isometric mapping, and in particular, the identity mapping, to the pixel gap area in the original frame. This automated portion of the process assumes a best-fit match for the pixel gap area as a pixel-by-pixel maximization. Any inaccuracies in reconstruction due to non-identity mapping of image area from one frame to the next, e.g. rotation, scaling, translation, and generic warping along the boundary, can then be addressed by the user with an image editing tool.

An image region comparison technique is used to determine if an image region in an alternate frame contains missing image information hidden in the original frame. By way of example, an image region is represented as a 2-dimensional topological set. Basic point-set topological operations then facilitate the pertinent region comparisons in the reconstruction process. This makes it possible to compare an image region filled by a graphical object in one frame with an image region occupied by that object in any other frame in the sequence.

FIGS. 7A and 7B illustrate how the shifting of an object in position over a sequence of frames makes is possible to locate missing image information in alternate frames. Referring to FIG. 7A, a region of image discrepancy caused by the shift of the object is determined quantitatively. This region is compared with the object's original region of definition in alternate frames to determine if any portion of the area of discrepancy is uncovered in those frames, as depicted in FIG. 7B. The object's non-shifted position in Frame 2 (FIG. 7B) is to the left of the object's non-shifted position in Frame 1 (FIG. 7A). This shift in the object's position over a sequence of frames makes it possible to "see" hidden surfaces behind the object in the original frame.

For a given frame, there may be multiple frames that provide some or all of the recovery (hidden pixel) information needed. In determining an optimal solution set, at least one frame may provide all of the recovery information. For example, and referring to FIG. 8, a frame in a search sequence is identified that provides the maximum area of recovery of any single frame in the sequence. In other situations, no single frame provides all of the information for an optimal solution set. For example, and referring to FIG. 9, available recovery information is retrieved and combined from a plurality of frames in the search sequence. Both methods can be employed by the software to find the optimal recovery area, i.e., the greatest area of pixel recovery possible given the problem constraints.

Implementation of the above logic utilizes a definition of a software object (in the object programming paradigm sense) that represents a self-aware topological point-set in $\Re^2$, e.g., an area object provided with basis point-set topological operators: union, intersection, and modulus, where the universe is defined as the entire frame area. This implementation provides a performance optimal, simple to use object that provides all the utility needed for the operations discussed in the previous section.

This representation is implemented as an incremental construction based on the 1-dimensional real interval. Each image scanline of the region is represented by a set of pariwise disjoint, monotone increasing interval subsets of the real line. The endpoints of an interval give an intersection of the scanline with the image region, thus, given a scanline subregion, SO, of a region, O, and its interval representation, $SO_i$, $$\forall x \in \Re, x \in SO_i \Leftrightarrow x \in SO \Rightarrow x \in O$$

So that for an x coordinate, this interval representation gives a discrete method for determining if x is in the closure of the image region or its compliment on the represented scanline level, i.e., the interval representation of each scanline of the image region gives a discrete mapping of the region's closure and compliment.

The 2-D representation of the entire image region is then constructed as a set of these intervals—one unique interval set for each scanline level, ordered in increasing scanline-level. Now given the image region O, there is provided its interval-set representation, $O_i$, and, $$\forall p(x, y) \in \Re^2, p \in O_i \Leftrightarrow p \in O$$

Thus a discrete, or more to the point, binary map of the entire image region has been constructed. This map makes possible fast containment checks for points as well as giving the functionality needed for set logic basis operations: union, intersection, and subtraction.

According to an embodiment of the present invention, a method of reconstructing a hidden surface area in an image includes the steps of: identifying a separation pixel gap in an image resulting from a repositioning of image pixels in the image to create a three-dimensional image; and providing replacement pixels for the separation pixel gap such that an image artifact resulting from the repositioning of image pixels is no longer visible in the three-dimensional image. In one embodiment, the step of providing replacement pixels further includes the steps of: identifying image frames that include image areas that are coincident with the separation pixel gap; and determining which of the image frames contains a largest body of useable pixel information for replacing information missing in the image due to the separation pixel gap. In one embodiment, the step of identifying image frames further includes the step of determining whether the image areas are topologically equivalent, under some isometric mapping, to a the separation pixel gap. In another embodiment, the step of providing replacement pixels further includes the step of comparing image regions to determine if an image region in an alternate image contains information missing from the image due to the separation pixel gap. In one embodiment, the step of comparing image regions further includes the steps of: representing the image regions as a two-dimensional topological sets; and employing point-set topological operations for pertinent image region comparisons. In another embodiment, the step of providing replacement pixels further includes the steps of: identifying image frames that include image areas that are coincident with the separation pixel gap; and combining useable pixel information from a plurality of the image frames for replacing information missing in the image due to the separation pixel gap.

In various embodiments of the present invention, the selected pixel fill area is positioned over the selected frame(s) to be utilized for retrieving background fill pixels. It should be appreciated, however, that the interactive tools of the present invention can also be configured to allow for the reverse as well. In other words, the background fill pixels of other frames can be positioned with reference to the pixel fill area.

Products generated by any of the systems or methods disclosed herein also fall within the scope of the present invention. Such products include, but are not limited to, any three-dimensional image generated employing any of the methods or systems described herein as well as any form of device upon which is stored information (or data) pertaining to any such three-dimensional image (e.g., machine-readable storage media such as DVDs, digital tape, etc.). Any data storage media that stores images, information or data created employing any of the methods or systems described herein also fall within the scope of the present invention. Accordingly, various embodiments of the present invention are also represented by articles of data storage media upon which are stored images, information or data created employing any of the methods described herein.

According to an embodiment of the present invention, a method for providing a three-dimensional image includes: receiving or accessing data created employing any of the methods described herein; and employing the data to reproduce a three-dimensional image.

Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

We claim:

1. A method for converting two-dimensional images into three-dimensional images, comprising the steps of:

for an image created as a new complimentary perspective from an original perspective image, and used in conjunction with the original perspective image to make up a three-dimensional stereoscopic pair of images, defining an area of pixels of a separation gap within the image that was caused by image pixels having moved; and replacing pixels in the separation gap with pixels from one or more different frames such that an image artifact resulting from the image pixels having moved is reduced or substantially eliminated;

wherein the step of replacing pixels further comprises comparing image regions to determine if an image region in an alternate image contains information missing from the image due to the separation gap.

2. The method for converting two-dimensional images into three-dimensional images of claim 1, wherein the step of replacing pixels comprises:

employing an interactive interface to select an area of pixels of a frame within a series or sequence of frames and to use pixels from the selected area to fill the separation gap.

3. The method for converting two-dimensional images into three-dimensional images of claim 1, wherein the step of replacing pixels comprises:

employing an interactive interface to select areas of pixels within a series or sequence of frames and to use pixels from the selected areas to fill the separation gap.

4. The method for converting two-dimensional images into three-dimensional images of claim 1, further comprising the step of:
scaling pixels in the separation gap.

5. The method for converting two-dimensional images into three-dimensional images of claim 1, further comprising the step of:
repositioning pixels in the separation gap.

6. The method for converting two-dimensional images into three-dimensional images of claim 1, further comprising the step of:
blurring pixels in the separation gap.

7. The method for converting two-dimensional images into three-dimensional images of claim 1, further comprising the step of:
color correcting pixels in the separation gap.

8. The method for converting two-dimensional images into three-dimensional images of claim 1, further comprising the step of:
distorting pixels in the separation gap.

9. A method of reconstructing a hidden surface area in an image, comprising the steps of:
identifying a separation pixel gap in an image resulting from a repositioning of image pixels to create a three-dimensional image;
identifying pixels from one or more images;
filling the separation pixel gap with the pixels such that an image artifact resulting from the repositioning of image pixels is reduced or substantially eliminated in the three-dimensional image; and
manipulating depth properties of the pixels in consideration of depth properties of adjacent object pixel surroundings;
wherein the step of filling the separation pixel gap further comprises
comparing image regions to determine if an image region in an alternate image contains information missing from the image due to the separation gap.

10. The method of reconstructing a hidden surface area in an image of claim 9, wherein the identified separation pixel gap is associated with an object in the image, and the identified pixels are associated with a corresponding object in a different image.

11. The method of reconstructing a hidden surface area in an image of claim 9, wherein the identified separation pixel gap is associated with a hidden portion of the image, and the identified pixels are associated with a corresponding portion of a different image that is at least partially visible in the different image.

12. The method of reconstructing a hidden surface area in an image of claim 9, wherein the identified pixels are from a plurality of different image frames.

13. The method of reconstructing a hidden surface area in an image of claim 9, wherein the step of filling in the separation pixel gap includes scaling the pixels to accommodate the separation pixel gap.

14. The method of reconstructing a hidden surface area in an image of claim 9, wherein the step of filling in the separation pixel gap includes rotating the pixels to accommodate the separation pixel gap.

15. The method of reconstructing a hidden surface area in an image of claim 9, wherein the step of filling in the separation pixel gap includes geometrically distorting the pixels.

16. The method of reconstructing a hidden surface area in an image of claim 9, wherein the step of filling in the separation pixel gap includes color correcting the pixels.

17. The method of reconstructing a hidden surface area in an image of claim 9, wherein the step of filling in the separation pixel gap includes blurring the pixels.

18. The method of reconstructing a hidden surface area in an image of claim 9, further comprising the step of:
applying a depth shape to the pixels.

19. A method of reconstructing a hidden surface area in an image, comprising the steps of:
identifying a separation pixel gap in an image resulting from a repositioning of image pixels to create a three-dimensional image;
identifying pixels from one or more images; and
filling the separation pixel gap with the pixels;
wherein the identified separation pixel gap is associated with an object in the image, and the identified pixels are associated with a corresponding object in a different image;
wherein the object is defined ignoring other objects that may be in front of the object.

20. A method of reconstructing a hidden surface area in an image, comprising the steps of:
for an image created as a new complimentary perspective from an original perspective image, and used in conjunction with the original perspective image to make up a three-dimensional stereoscopic pair of images, identifying a separation pixel gap resulting from a repositioning of pixels in the image to create a three-dimensional image;
providing replacement pixels for the separation pixel gap such that an image artifact resulting from the repositioning of image pixels is reduced or substantially eliminated in the three-dimensional image; and
employing a plurality of different pixel till techniques to determine the replacement pixels for the separation pixel gap which best match adjacent background pixels;
wherein the step of providing replacement pixels further comprises
comparing image regions to determine if an image region in an alternate image contains information missing from the image due to the separation pixel gap.

21. A method of reconstructing a hidden surface area in an image, comprising the steps of:
for an image created as a new complimentary perspective from an original perspective image, and used in conjunction with the original perspective image to make up a three-dimensional stereoscopic pair of images, identifying a separation pixel gap in the image resulting from a repositioning of image pixels in the image to create a three-dimensional image; and
providing replacement pixels for the separation pixel gap such that an image artifact resulting from the repositioning of image pixels is no longer visible in the three-dimensional image;
wherein the step of providing replacement pixels further comprises
comparing image regions to determine if an image region in an alternate image contains information missing from the image due to the separation pixel gap.

22. A method of reconstructing a hidden surface area in an image, comprising the steps of:

identifying a separation pixel gap in an image resulting from a repositioning of image pixels in the image to create a three-dimensional image; and providing replacement pixels for the separation pixel gap such that an image artifact resulting from the repositioning of image pixels is no longer visible in the three-dimensional image;

wherein the step of providing replacement pixels further comprises identifying image frames that include image areas that are coincident with the separation pixel gap, and determining which of the image frames contains a largest body of useable pixel information fix replacing information missing in the image due to the separation pixel gap.

23. The method of reconstructing a hidden surface area in an image of claim 22, wherein the step of identifying image frames further comprises the step of:

determining whether the image areas are topologically equivalent, under some isometric mapping, to the separation pixel gap.

24. A method of reconstructing a hidden surface area in an image, comprising the steps of:

identifying a separation pixel gap in an image resulting from a repositioning of image pixels in the image to create a three-dimensional image; and providing replacement pixels for the separation pixel gap such that an image artifact resulting from the repositioning of image pixels is no longer visible in the three-dimensional image;

wherein the step of providing replacement pixels further comprises comparing image regions to determine if an image region in an alternate image contains information missing from the image due to the separation pixel gap.

25. The method of reconstructing a hidden surface area in an image of claim 24, wherein the step of comparing image regions further comprises the steps of:

representing the image regions as a two-dimensional topological sets; and employing point-set topological operations for pertinent image region comparisons.

26. A method for providing a three-dimensional image, comprising:

receiving or accessing data created employing any of the methods of claims 1–18 and 20–25; and employing the data to reproduce a three-dimensional image.

* * * * *